US008621630B2

(12) United States Patent
Economos, Jr. et al.

(10) Patent No.: US 8,621,630 B2
(45) Date of Patent: Dec. 31, 2013

(54) SYSTEM, METHOD AND DEVICE FOR CLOUD-BASED CONTENT INSPECTION FOR MOBILE DEVICES

(75) Inventors: George Economos, Jr., Bayport, NY (US); Vadim Ismailov, Holtsville, NY (US)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 13/163,514

(22) Filed: Jun. 17, 2011

(65) Prior Publication Data

US 2012/0324581 A1 Dec. 20, 2012

(51) Int. Cl.
*G06F 12/14* (2006.01)

(52) U.S. Cl.
USPC ............... 726/23; 726/22; 726/24; 726/25

(58) Field of Classification Search
None
See application file for complete search history.

(56) References Cited

U.S. PATENT DOCUMENTS

| | | | |
|---|---|---|---|
| 6,842,861 B1 | 1/2005 | Cox et al. | 713/188 |
| 7,613,445 B1* | 11/2009 | Stanev | 455/407 |
| 7,769,994 B2 | 8/2010 | Peles | 713/153 |
| 7,865,957 B1* | 1/2011 | Gu et al. | 726/24 |
| 8,161,130 B2* | 4/2012 | Stokes et al. | 709/217 |
| 8,204,945 B2* | 6/2012 | Milliken et al. | 709/206 |
| 2007/0143824 A1* | 6/2007 | Shahbazi | 726/1 |
| 2008/0201722 A1* | 8/2008 | Sarathy | 719/311 |
| 2010/0011432 A1 | 1/2010 | Edery et al. | 726/11 |
| 2010/0205265 A1* | 8/2010 | Milliken et al. | 709/206 |
| 2011/0034147 A1* | 2/2011 | Issa et al. | 455/410 |
| 2011/0087766 A1* | 4/2011 | Kuo et al. | 709/224 |
| 2013/0097660 A1* | 4/2013 | Das et al. | 726/1 |

OTHER PUBLICATIONS

Oberheide, K.V. et al. *Virtualized In-Cloud Security Services for Mobile Devices*. Published 2008. http://www.google.co.in/url?sa=t &source=web&cd=1&ved+0CCUQFjAA&url=http%3A%2 Fciteseerx.ist.psu.edu%2Fviewdoc%2Fdownload%Fdoi%3D10.1. 1.169.5857%26rep%%3Drep1%26type%Dpdr&rct=j&q= Virtualized%20In-Cloud%20Security%20Services%20% for%20Mobile%20Devices&ei=-3qQTZ-SOIW6hAeu_dy7Dg &usg+AFQjCNEQopqwGb15WxkDDUleEMDoEJ_UZw &sig2=c0x0qUmmG-iShda_sPS8nw&cad=rja. 5pp.

Zhao, B. et al. *Mirroring Smartphones for Good: a Feasibility Study*. Published Dec. 6-9, 2010. http://www.cse/psu.edu/~bzhao/mirror_ report.pdf. 8 pp.

TechNet Magazine. *Microsoft Forefront: Secure Access to Your Cloud Services*. Retrieved Mar. 28, 2011. http://technet.microsoft. com/en-us/magazine/gg607680.aspx. 6 pp.

(Continued)

*Primary Examiner* — Kaveh Abrishamkar (74) *Attorney, Agent, or Firm* — Merchant & Gould (57) ABSTRACT

A content inspection system provides cloud-based content inspection for mobile devices. The content inspection system includes a content inspection server for receiving a request providing a digital fingerprint of content for evaluation for threats and a data reputation services server for maintaining a threat database. The content inspection system communicates with the mobile device using a service oriented architecture web services based on exchanges of messages between agents of the content inspection system and the mobile device. The content inspection server authenticates the received request belongs to a subscriber, and once the request is authenticated, the data reputation services server operates on the request to determine whether content identified by the digital fingerprint matches pre-existing claims in the threat database. The content inspection system generates a threat evaluation response for the mobile device based on reviewing the threat database for pre-existing claims.

20 Claims, 5 Drawing Sheets

(56) References Cited

OTHER PUBLICATIONS

Shah, S.K. *Exploring Reliability of Cloud Antivirus solutions*. Retrieved Mar. 29, 2011. http://web.njit.edu/~sks36/resources/Final_Saurin_Shah.pdf. 5 pp.

Security Week News. *Zscaler Unveils Cloud Based Mobile Device Protection*. Retrieved Mar. 29, 2011. http://www.securityweek.com/zscaler-unveils-cloud-based-mobile-device-protection. 5 pp.

* cited by examiner

SYSTEM, METHOD AND DEVICE FOR CLOUD-BASED CONTENT INSPECTION FOR MOBILE DEVICES

FIELD OF THE INVENTION

This disclosure relates in general to data security and more specifically to cloud based content inspection to reduce the burden on a mobile device's resources.

BACKGROUND

Mobile devices have become ubiquitous. Such devices are very compact and have very limited resources. Because of their popularity and wide-spread use, mobile devices have recently become a target for malicious attacks much as computers have in the past. However, the traditional ways of protecting devices from attacks using client-based scanners put a strain on the resources of mobile devices. For example, processing events and files using a client-based application utilizes a substantial amount of CPU resources, which in turn drains the battery. Mobile devices often do not have processors that are as powerful as processors found in laptops and desktop computers. Besides the strain placed on processors and batteries, storage is another concern. A client-based application stores the signatures for malicious events and files. The signatures require a significant amount of storage capacity. However, mobile devices typically have limited storage capacity thereby presenting a problem for a client-based solution. In addition, the data needed to scan for attacks may be downloaded to the device. Mobile devices normally communicate using a wireless connection, such as a cellular network connection or a Wi-Fi connection. While bandwidth continues to increase for downloading data using such connections, wired connections are much faster. Thus, downloading the data needed to scan for attacks would be very slow and inefficient, and would also place further load on the battery.

Accordingly, there is a need for a system, method, and device for cloud-based content inspection for mobile devices.

SUMMARY

To overcome the limitations described above, and to overcome other limitations that will become apparent upon reading and understanding the present specification; embodiments for a system, method, and device for cloud-based content inspection are disclosed.

The above-described problems are solved by moving the content inspection off the mobile device and into the cloud to reduce the burden on the device's resources. In particular the CPU, memory, local storage and battery will benefit considerably. Rich content inspection, including and not limited to anti-virus, anti-spam, information protection, will be delivered while having a significantly reduced footprint on the mobile device.

An embodiment includes a cloud-based content inspection system for mobile devices. The cloud-based content inspection system includes a content inspection system, accessible by a remotely located mobile device, for providing cloud-based content inspection for the remotely located mobile device. The content inspection system includes a content inspection server for receiving from the mobile device a request providing a digital fingerprint of content for evaluation for threats and a data reputation services server for maintaining a threat database. The content inspection system communicates with the remotely located mobile device using a service oriented architecture web services based on exchanges of messages between agents of the content inspection system and the remotely located mobile device, the content inspection server authenticates the received request belongs to a subscriber, and once the request is authenticated, the data reputation services server operates on the request to determine whether content identified by the digital fingerprint matches pre-existing claims in the threat database. The content inspection system generates a threat evaluation response for the mobile device based on reviewing the threat database for pre-existing claims.

In another embodiment a method for providing cloud-based content inspection for mobile devices is disclosed. The method includes providing a content inspection system, accessible by a remotely located mobile device, for performing cloud-based content inspection for the remotely located mobile device, wherein the providing the content inspection system further comprises providing a content inspection server for receiving a request from the mobile device providing a digital fingerprint of content for evaluation for threats and providing a data reputation services server for maintaining a threat database, authenticating, at the content inspection server, that the received request belongs to a subscriber, operating on the request, by the data reputation server once the request is authenticated, to determine whether content identified by the digital fingerprint matches pre-existing claims in the threat database and generating a threat evaluation response to be provided to the mobile device based on reviewing the threat database for pre-existing claims.

In another embodiment, a computer readable storage device having stored therein data representing instructions executable by a computer to implement cloud-based content inspection for mobile devices is disclosed. The computer readable storage device includes providing a content inspection system, accessible by a remotely located mobile device, for performing cloud-based content inspection for the remotely located mobile device, wherein the providing the content inspection system further comprises providing a content inspection server for receiving a request from the mobile device providing a digital fingerprint of content for evaluation for threats and providing a data reputation services server for maintaining a threat database, authenticating, at the content inspection server, that the received request belongs to a subscriber, operating on the request, by the data reputation server once the request is authenticated, to determine whether content identified by the digital fingerprint matches pre-existing claims in the threat database and generating a threat evaluation response to be provided to the mobile device based on reviewing the threat database for pre-existing claims.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

As briefly described above, embodiments of the present invention are directed to providing cloud-based content inspection for mobile devices. By moving the content inspection off the mobile device and into the cloud, the burden on the device's resources is reduced. In particular the CPU, memory, local storage and battery will benefit considerably. Rich content inspection, including and not limited to anti-virus, anti-spam, information protection, will be delivered while having a significantly reduced footprint on the mobile device.

Figure 1:
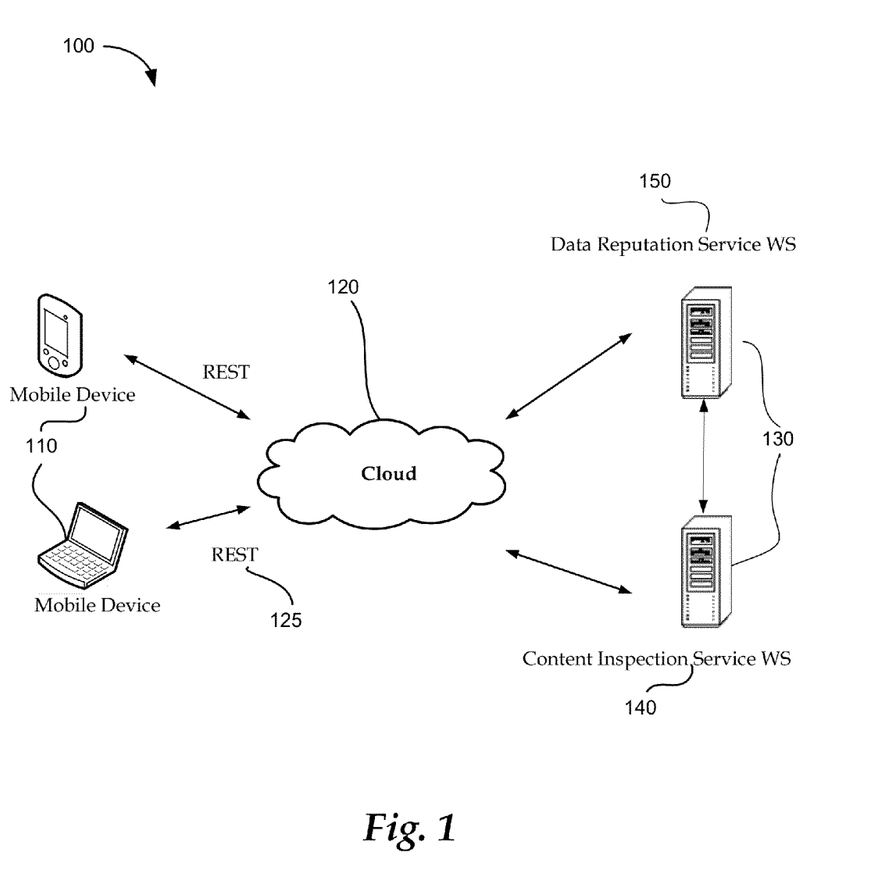
FIG. 1 provides a high level architecture of cloud based content inspection for mobile devices according to one embodiment.

FIG. 1 provides a high level architecture of cloud based content inspection for mobile devices 100 according to one embodiment. Content inspection is moved off the mobile device 110 and into the cloud 120. Content inspection is performed in a data server 130 or data center that is accessed by the mobile device 110. The solution uses RESTful (Representational State transfer) web services as the end points in the cloud to communicate with the mobile device. Restful Web Services is a set of architectural principles, wherein resources (sources of specific information), each of which is referenced with a global identifier, communicate via a standardized interface (e.g., HTTP) and exchange representations of these resources (the actual documents conveying the information). REST style architectures 125 includes clients and servers. Clients initiate requests to servers; servers process requests and return appropriate responses. Thus, an application can interact with a resource by knowing two things: the identifier of the resource and the action required. Requests and responses are built around the transfer of representations of resources. A resource can be essentially any coherent and meaningful concept that may be addressed. A representation of a resource is typically a document that captures the current or intended state of a resource, e.g., a digital signature of a virus, spyware, spam, etc.

Accordingly, an agent or client application running on the mobile device 110 points to the server 130, e.g., using a URL. The agent merely utilizes a Restful API to communicate with the server 130. The API allows the agent to be operating system independent, e.g., the agent could be Windows, Lenox, Mac, IOS, etc. The mobile device 110 sends threads that the mobile device wants the server 130 to analyze. For instance, the request may be associated with a virus, spyware, spam, data leakage, etc. The service decides whether the request is forwarded to the content inspection services 140 or whether the request is sent directly to the reputation service 150. Thus, the user interacts with the same interface regardless of what transpires at the service.

Figure 2:
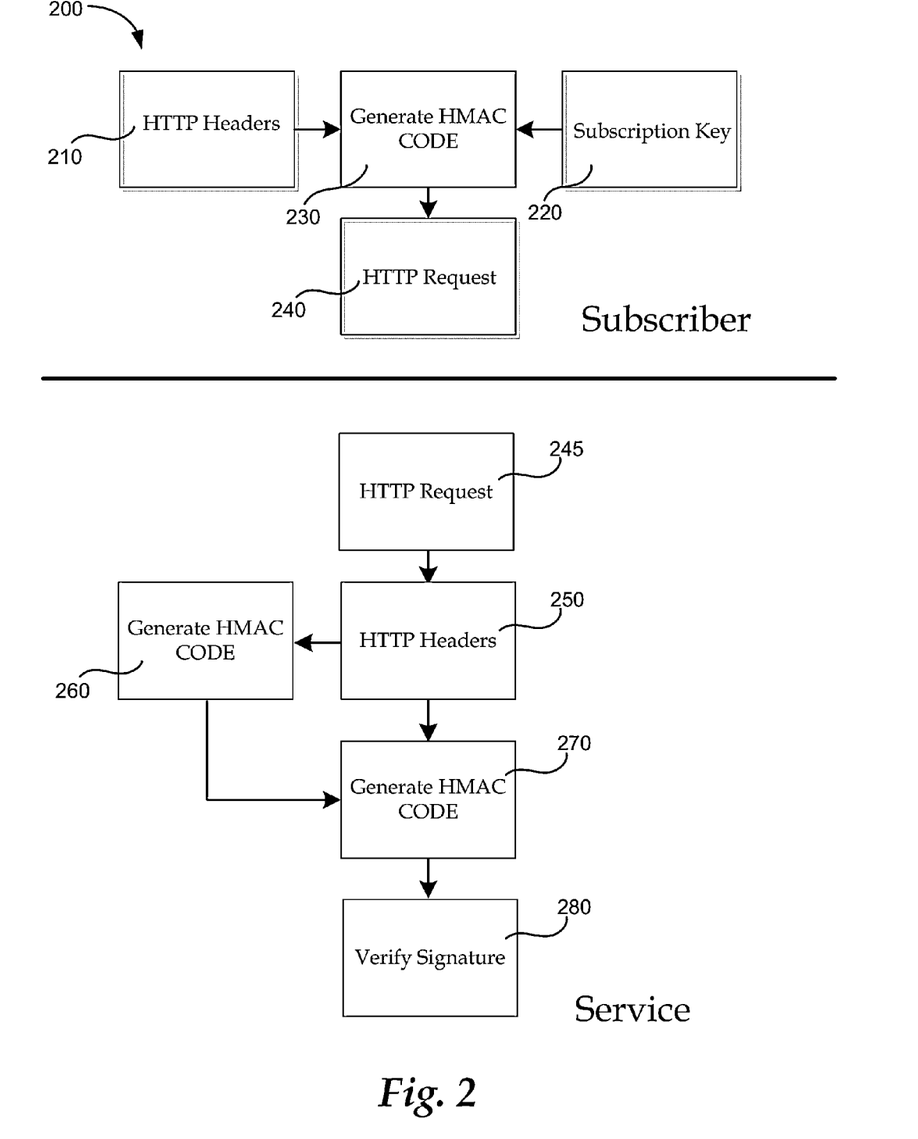
FIG. 2 is an authentication block diagram model according to one embodiment.

FIG. 2 is an authentication block diagram model 200 according to one embodiment. The authentication process checks the integrity of content to be cloud inspected by verifying a subscriber's identity to the system via a digital signature. The concept of a digital fingerprint is analogous to a digitally computed numerical identifier based on a 'hash' or mathematical function that is performed on the information or data object. By computing a hash-value of the contents of an object, for example using a rigorous mathematical algorithm such as MD5 or SHA, a fingerprint is generated based on the numerical value (the hash). HMAC (Hash Message Authentication Code) authorization involves a client and server having a shared secret key. When sending a request to the server, the client 'signs' the fingerprint using the secret key. Thus, the fingerprint is encrypted with the secret key; therefore, it is referred to as the digital signature of the content.

The authentication solution implements a subscription model where users of the service register and receive a subscription key 220. The subscription may be a "flat fee model" or a "pay per scan" model. In the "flat fee model" users can request and pay for a pre-determined number of scans in the specified subscription period. The "pay per scan" charges the user on a per scan basis which then can be billed. The subscription key 220 is used to authenticate service requests based on use of hashing for authentication. A secret key, which only the service provider knows, is associated with the subscription key 220 and is used to authenticate HTTP requests received 245 by the Service. A subset of the HTTP headers 210 are hashed with an algorithm (making a fingerprint) and then signed with the subscription key 220. The computed HMAC code 230 and subscription key 220 are added back to the HTTP headers 210 so that the service can authenticate the request 240 sent by the subscriber.

At the server side, the HTTP Headers 250 within the HTTP Request 245 received includes the unique subscription key 220, threats, and timestamp. The timestamp is applied when the subscriber makes the request 240. When the server actually receives the request 245, there will be some time delta. If the time delta is greater than a predetermined limit, then the request will be disregarded. In addition, if an intermediary attempts to change the timestamp, the signature will be broken and the server will be able to detect such interference. The subscription key 220 is used to look up the associated secret key to perform the same message hash (i.e. SHA or MD5) as the client 260. If the signature produced by the service matches the signature sent by the subscriber 270, the server can be assured that the subscriber also possesses the shared secret key, therefore verifying the signature 280. If the signatures do not match the request is rejected and access denied.

Figure 3:
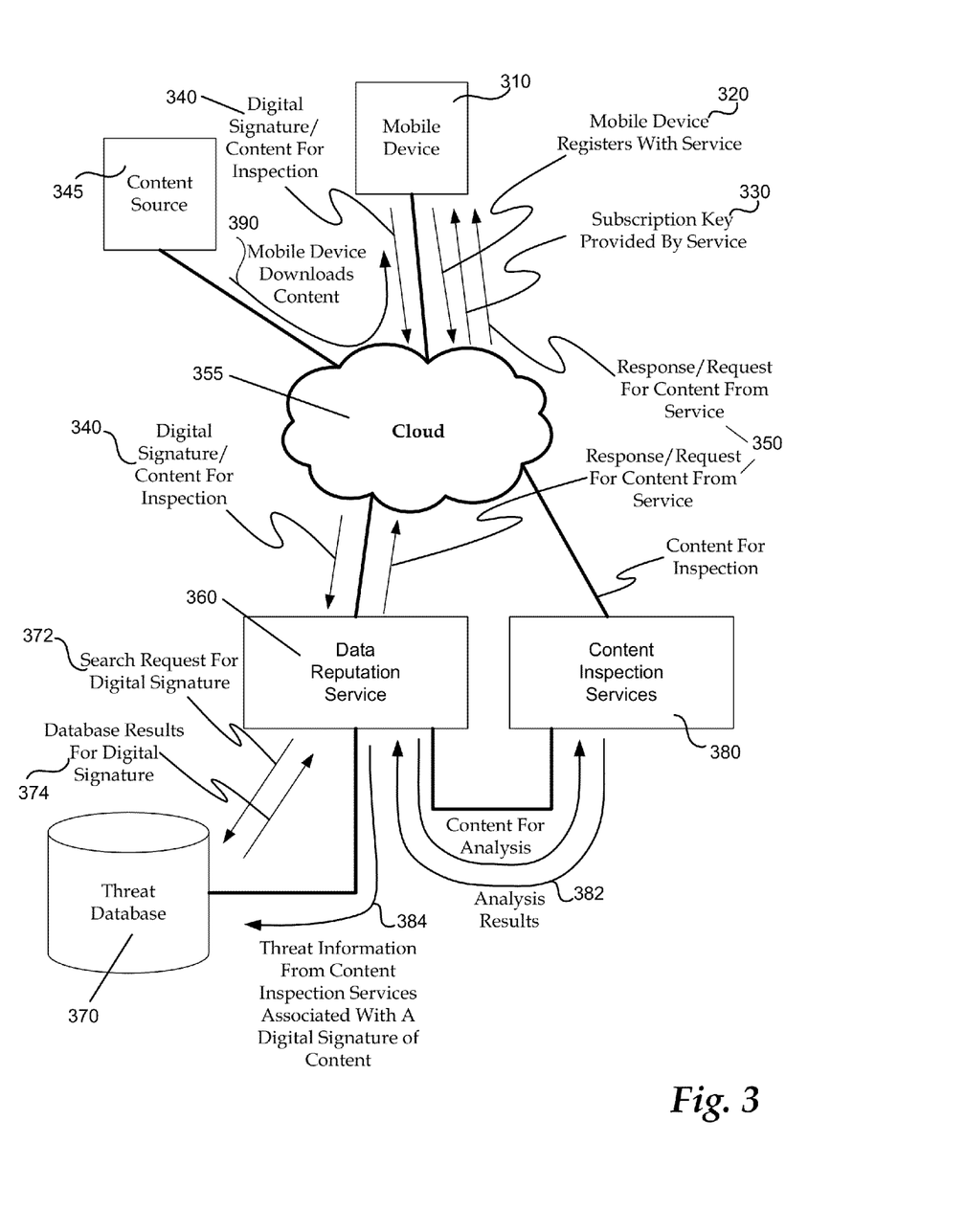
FIG. 3 is the mobile device process flow for cloud-based content inspection services according to one embodiment.

FIG. 3 is the mobile device process flow 300 for cloud-based content inspection services according to one embodiment. Initially, a mobile device 310 registers with the inspection service 320 and obtains a subscription key 330. Thereafter, every correspondence from the mobile device 310 to the service includes the subscription key 330. A digital signature/content 340 is sent to the data reputation service 360 for inspection via the cloud 355. Thus, the mobile device 310 sends a request to the data reputation service 360 that contains the hash of the digital signature/content 340 where the mobile device wants the service to determine whether a malicious threat is present. The service then sends a response/request 350 back to the mobile device 310 that includes a verdict on the analysis of the potential threat.

Accordingly, actual content is not sent for scanning Rather, only a digital signature/content 340 is sent. For example, when the mobile device 310 receives a message with an attached file from an external Content Source 345, the mobile device needs to determine whether the attachment is safe to access. However, the file can be quite large. Thus, sending the whole file to the cloud 355 can take too much time; therefore, a digital digital signature/content 340 calculated by the mobile device 310 is provided to the data reputation service 360. The reputation service includes a threat database 370. The server, once the request is authenticated, performs a database lookup for the digital signature obtained from the request 372 to determine whether the file has been analyzed previously. If the results 374 indicate a hit on a entry in the database, the service may provide a response 350 to the mobile device 310 that gives information about the file. If the database does not include a record associated with the digital signature/content 340, the digital signature/content 340 is scanned for all potential threats by content inspection services 380. Thus, the response from the service may be an indication that the digital signature did not result in any hits from the database and a response/request 350 for content is sent to the mobile device 310. Once the content has been analyzed, the results 382 are sent to the data reputation service 360 and the database 370 is updated with the threat information from content inspection services associated with a digital signature of content 384. If the content is threat-free, the mobile device downloads the content 390.

Figure 4:
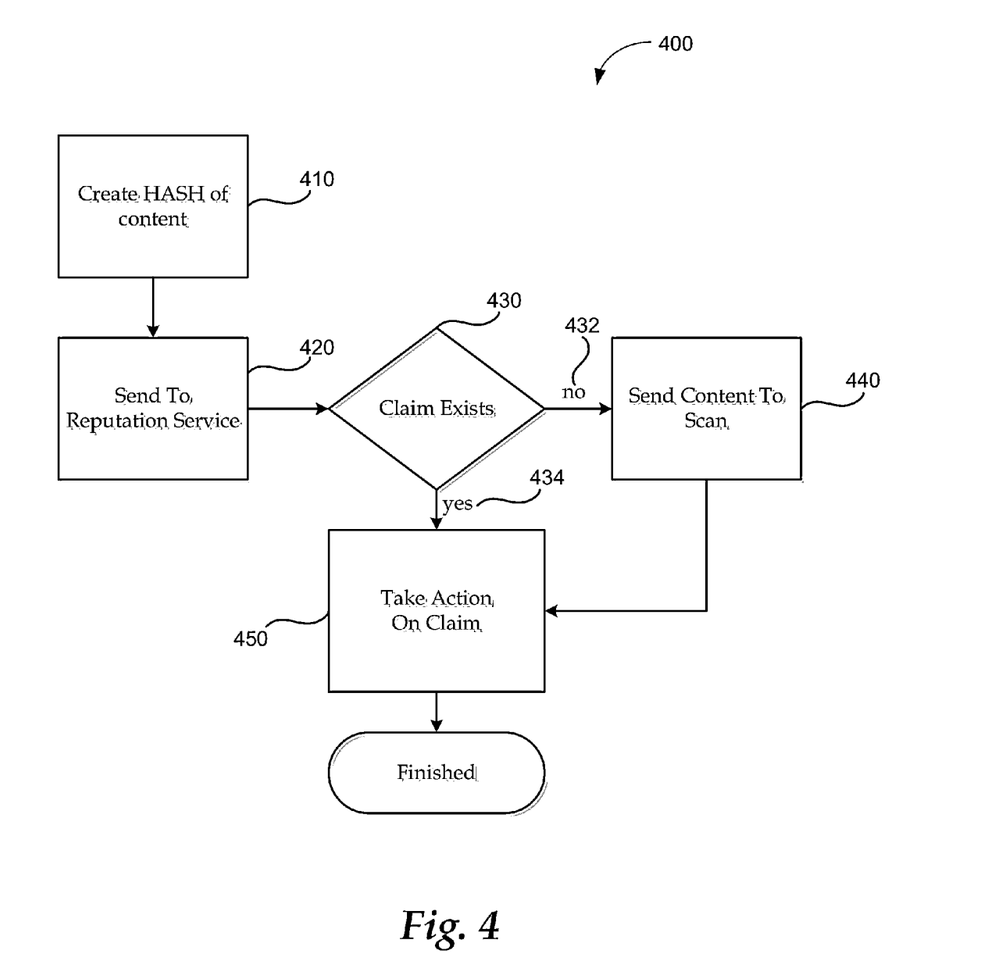
FIG. 4 provides a flowchart of the data reputation services process according to one embodiment.

FIG. 4 provides a flowchart of the data reputation services process 400 according to one embodiment. The use of data reputation services 420 limit the amount of data needed to be sent to the inspection service. The reputation service 420 contains claims about the overall hygiene of existing data that has already been inspected by the service. The reputation service 420 is queried by the mobile device, which generates a hash of the content 410 at the mobile device that uniquely identifies the content. The reputation service 420 checks for any pre-existing claims 430. If no such claim exists 432, the content is sent to inspection service 440 from the mobile device and the reputation service is updated with claims about the content for subsequent queries 450. If claims do exist 434, appropriate action is taken on the claim 450.

Figure 5:
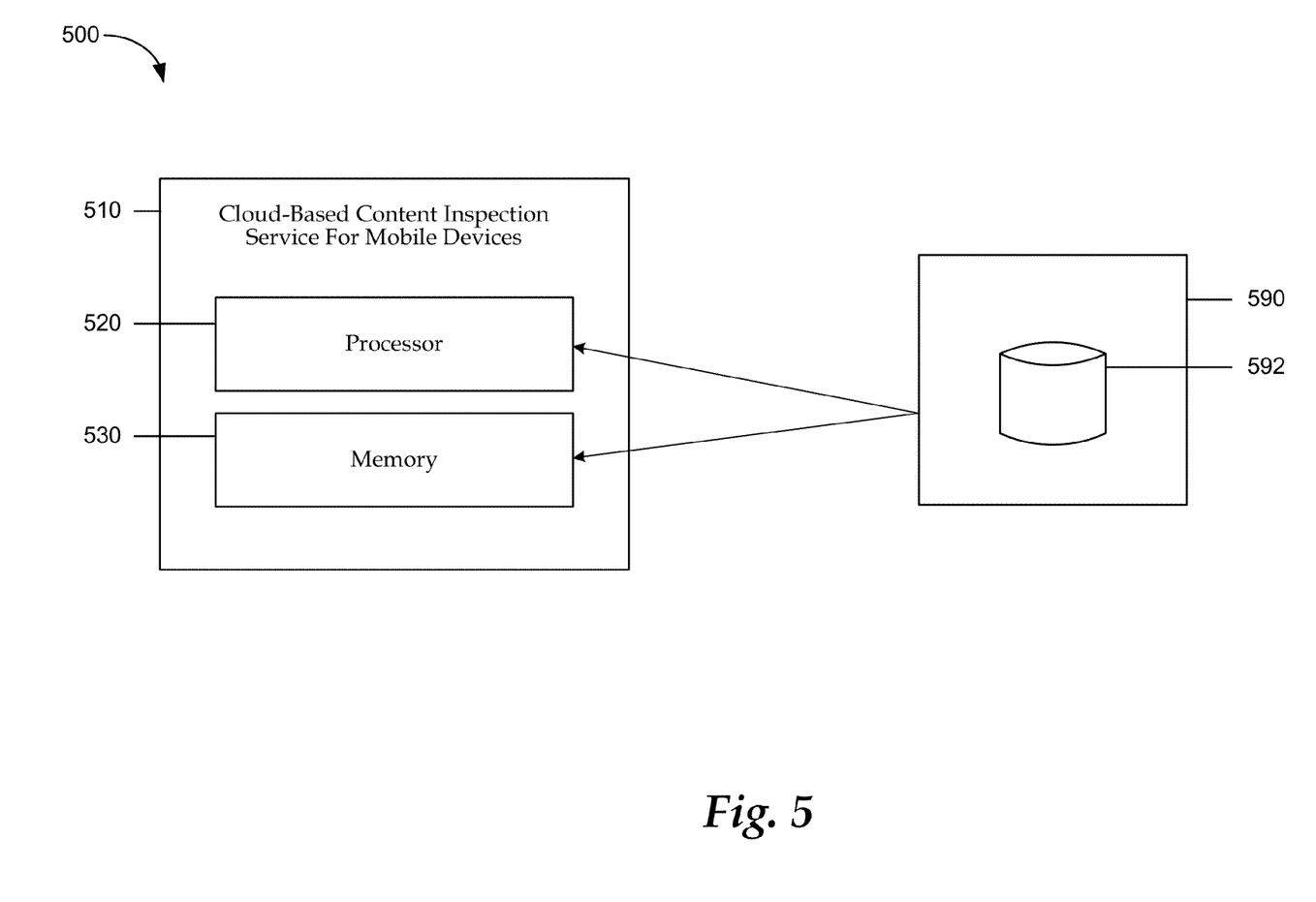
FIG. 5 illustrates a suitable computing environment for implementing a system as described above in FIGS. 1-4 according to an embodiment.

FIG. 5 illustrates a suitable computing environment 500 for implementing a system as described above in FIGS. 1-4 according to an embodiment. In FIG. 5, Content Inspection Services for mobile devices 510 includes a processor 520 and memory 530. Those skilled in the art will recognize that the server 510 may be implemented in a head end module, a session resource manager, and other data/content control devices. Embodiments may also be implemented in combination with other types of computer systems and program modules. Generally, program modules include routines, programs, components, data structures, and other types of structures that perform particular tasks or implement particular abstract data types. By way of example, computer readable media 590 can include computer storage media or other tangible media. Computer storage media 590 includes volatile and nonvolatile, removable and non-removable media implemented in any method or technology for storage of information 592, such as computer readable instructions, data structures, program modules or other data. Moreover, those skilled in the art will appreciate that other computer system configurations may be implemented, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 590 may refer to a mass storage device, such as a hard disk or CD-ROM drive. Tangible computer-readable media is accessed or utilized by a processing device, e.g., server or communications network provider infrastructure. By way of example, and not limitation, computer-readable media 590 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of the processor 520. Thus, the processor 520 may be configured to execute instructions that perform the operations of embodiments. It should also be appreciated that various embodiments can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of embodiments as recited within the claims set forth herein. Memory 530 thus may store the computer-executable instructions that, when executed by processor 520, cause the processor 520 to implement content inspection and data reputation services according to an embodiment as described above with reference to FIGS. 1-4.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not with this detailed description, but rather by the claims appended hereto.

We claim:

1. A cloud-based content inspection system for mobile devices, comprising:
a content inspection system, accessible by a remotely located mobile device, for providing cloud-based content inspection for the remotely located mobile device, the content inspection system including:
a content inspection server for receiving from the mobile device a HTTP request including HTTP headers providing threat types, a timestamp for ensuring the HTTP request is not received by the content inspection server after a predetermined limit, a subscription key providing a unique identifier of the mobile device, and a digital fingerprint of content comprising a hash value of the content for evaluation for threats; and
a data reputation services server for maintaining a threat database;
wherein the content inspection system communicates with the remotely located mobile device using a service oriented architecture web services based on exchange of messages between agents of the content inspection system and the remotely located mobile device, the content inspection server authenticating that the HTTP request to was received from a subscriber, once the HTTP request is authenticated the data reputation services server determines whether the content identified by the digital fingerprint matches pre-existing claims in the threat database, wherein the content inspection system provides a threat evaluation response to the mobile device based on reviewing the threat database for pre-existing claims.

2. The cloud-based content inspection system of claim 1, wherein the content inspection server registers a mobile device for a subscription service and provides a unique subscription key for the mobile device based on the registering of the mobile device.

3. The cloud-based content inspection system of claim 2, wherein a secret key is associated with the unique subscription key, the content inspection server using the secret key to authenticate a subscribed mobile device when the HTTP request is received by the content inspection server.

4. The cloud-based content inspection system of claim 2, wherein the subscription service comprises a flat fee model.

5. The cloud-based content inspection system of claim 2, wherein the subscription service comprises a pay per scan model.

6. The cloud-based content inspection system of claim 2, wherein the content inspection server retrieves an associated secret key based on inspection of the HTTP request to identify the subscription key of the mobile device, performs a hash using the retrieved associated secret key and verifies that a resulting digital fingerprint matches the digital fingerprint associated with the HTTP request.

7. The cloud-based content inspection system of claim 1, wherein the service oriented architecture web services comprises a representational state transfer (REST) architecture for providing web services.

8. The cloud-based content inspection system of claim 1, wherein the threat evaluation response provided to the mobile device indicates the digital fingerprint of the content matched an entry in the threat database and includes threat information obtained from the threat database.

9. The cloud-based content inspection system of claim 1, wherein the threat evaluation response provided to the mobile device indicates the digital fingerprint of the content did not matched a entry in the threat database and requests actual content to be provided for evaluation for threats.

10. The cloud-based content inspection system of claim 1, wherein the content inspection server scans content received in response to the threat evaluation response provided to the mobile device for threats, transmits results of the scan for threats to the mobile device and provides the data reputation services server an update for the threat database based on the scan for threats.

11. A method for providing cloud-based content inspection for mobile devices, comprising:
providing a content inspection system, accessible by a remotely located mobile device, for performing cloud-based content inspection for the remotely located mobile device, wherein the providing the content inspection system further comprises providing a content inspection server for receiving a HTTP request from the mobile device, the HTTP request including HTTP headers providing threat types, a timestamp for ensuring the HTTP request is not received by the content inspection server after a predetermined limit, a subscription key providing a unique identifier of the mobile device, and a digital fingerprint of content comprising a hash value of the content for evaluation for threats and providing a data reputation services server for maintaining a threat database;
authenticating, at the content inspection server, that the HTTP request was received from a subscriber;
operating on the HTTP request, by the data reputation services server once the HTTP request is authenticated, to determine whether the content identified by the digital fingerprint matches pre-existing claims in the threat database; and
generating a threat evaluation response to be provided to the mobile device based on reviewing the threat database for pre-existing claims.

12. The method of claim 11 further comprising registering the mobile device for a subscription service and providing a unique subscription key for the mobile device based on the registering of the mobile device and associating a secret key with the unique subscription key, using the secret key to authenticate a subscribed mobile device when the HTTP request is received by the content inspection server.

13. The method of claim 11 further comprising retrieving, by the content inspection server, an associated secret key based on inspection of the HTTP request to identify the subscription key of the mobile device, performing a hash using the retrieved associated secret key and verifying that a resulting digital fingerprint matches the digital fingerprint associated with the HTTP request.

14. The method of claim 11 further comprising indicating in the threat evaluation response provided to the mobile device that the digital fingerprint of the content matched an entry in the threat database and includes threat information obtained from the threat database.

15. The method of claim 11 further comprising indicating in the threat evaluation response provided to the mobile device that the digital fingerprint of the content did not matched a entry in the threat database, requesting actual content to be provided for evaluation for threats, scanning the content received in response to the threat evaluation response provided to the mobile device, transmitting results of the scan for threats to the mobile device and providing the data reputation services server an update for the threat database based on the scan for threats.

16. The method of claim 11 further comprising sending and receiving messages between agents of the content inspection system and the remotely located mobile device using a service oriented architecture web services.

17. A computer readable storage device having stored therein data representing instructions executable by a computer to implement cloud-based content inspection for mobile devices, comprising:
providing a content inspection system, accessible by a remotely located mobile device, for performing cloud-based content inspection for the remotely located mobile device, wherein the providing the content inspection system further comprises providing a content inspection server for receiving a HTTP request from the mobile device, the HTTP request including HTTP headers providing threat types, a timestamp for ensuring the HTTP request is not received by the content inspection server after a predetermined limit, a subscription key providing a unique identifier of the mobile device, and a digital fingerprint of content comprising a hash value of the content for evaluation for threats and providing a data reputation services server for maintaining a threat database;
authenticating, at the content inspection server, that the HTTP request was received from a subscriber;
operating on the HTTP request, by the data reputation services server once the HTTP request is authenticated, to determine whether the content identified by the digital fingerprint matches pre-existing claims in the threat database; and
generating a threat evaluation response to be provided to the mobile device based on reviewing the threat database for pre-existing claims.

18. The computer readable storage device of claim 17 further comprising registering the mobile device for a subscription service and providing a unique subscription key for the mobile device based on the registering of the mobile device and associating a secret key with the unique subscription key, using the secret key to authenticate a subscribed mobile device when the HTTP request is received by the content inspection server.

19. The computer readable storage device of claim 17 further comprising retrieving, by the content inspection server, an associated secret key based on inspection of the HTTP request to identify the subscription key of the mobile device, performing a hash using the retrieved associated secret key and verifying that a resulting digital fingerprint matches the digital fingerprint associated with the HTTP request.

20. The computer readable storage device of claim 17 further comprising indicating in the threat evaluation response provided to the mobile device that the digital fingerprint of the content matched an entry in the threat database and includes threat information obtained from the threat database.

* * * * *